(12) United States Patent
Cumoli et al.

(10) Patent No.: US 6,377,698 B1
(45) Date of Patent: Apr. 23, 2002

(54) METHOD OF LOCATING HIGHLY VARIABLE BRIGHTNESS OR COLOR REGIONS IN AN IMAGE

(75) Inventors: Marco Cumoli; Claudio Saporetti; Stefano Amorosi, all of Bologna (IT)

(73) Assignee: Datalogic S.p.A., Lippo di Calderara di Reno (IT)

( * ) Notice: Subject to any disclaimer, the term of this patent is extended or adjusted under 35 U.S.C. 154(b) by 0 days.

(21) Appl. No.: 09/192,268

(22) Filed: Nov. 16, 1998

(30) Foreign Application Priority Data

Nov. 17, 1997 (EP) .............................. 97830607

(51) Int. Cl.$^7$ ............................ G06K 9/46; G06K 9/56; G06T 7/40
(52) U.S. Cl. ..................... 382/101; 382/173; 382/282
(58) Field of Search .................. 382/100, 101, 382/112, 141, 143, 151, 164, 165, 173, 197, 205, 282, 291, 306; 270/52.01; 379/910; 235/462.03, 462.11, 462.24, 462.41, 462.08, 900, 462.01–462.09, 462.17

(56) References Cited

U.S. PATENT DOCUMENTS

| | | | | |
|---|---|---|---|---|
| 5,120,940 A | | 6/1992 | Willsie | 235/462 |
| 5,373,147 A | | 12/1994 | Noda | 235/462 |
| 5,504,319 A | * | 4/1996 | Li et al. | 235/462 |
| 5,545,887 A | * | 8/1996 | Smith et al. | 235/462 |
| 5,748,804 A | * | 5/1998 | Surka | 382/291 |
| 6,047,893 A | * | 4/2000 | Saporetti | 235/462.1 |

OTHER PUBLICATIONS

N. Normand, C. Viard–Gaudin, A Two–Dimensional Bar Code Reader, IEEE Signal processing, Proceedings of the 12$^{th}$ IAPR International Conference on Pattern Recognition, vol. 3, 1994, pp. 201–203.*

* cited by examiner

*Primary Examiner*—Leo Boudreau
*Assistant Examiner*—Brian P. Werner
(74) *Attorney, Agent, or Firm*—Nixon & Vanderhye P.C.

(57) ABSTRACT

A method of locating highly variable brightness or color regions in an image having at least one specifically ordered region corresponding, for example, to the image of an optical code defined by different-colored elements with a predetermined orientation and at least one highly variable brightness or color region of an order level other than that of the specifically ordered region. A first intermediate binary image is generated representing the acquired image divided into a number of contiguous first subimages, each having a first logic value if corresponding to a specifically ordered region and a second logic value otherwise. A second intermediate binary image is generated representing the acquired image divided into a number of contiguous second subimages, each having a first logic value if corresponding to a specifically ordered region and/or to a highly variable brightness or color region and a second logic value otherwise. The first intermediate binary image is subtracted from the second intermediate binary image to generate an output binary image defined by a number of contiguous subimages having the first logic value only at the highly variable brightness or color regions.

13 Claims, 4 Drawing Sheets

METHOD OF LOCATING HIGHLY VARIABLE BRIGHTNESS OR COLOR REGIONS IN AN IMAGE

BACKGROUND OF THE INVENTION

The present invention relates to a method of locating highly variable brightness or colour regions in an image.

Systems are known for locating optical codes applied to objects moving along conveying devices (e.g. conveyor belts), and for determining the presence and space disposition of the code. As is known optical codes (e.g. bar codes, two-dimensional codes, etc.) are defined by a number of two-dimensional elements of given shape, of different colours (e.g. black/white or variously coloured elements), and arranged in a precise geometric order.

Some known locating systems use optical sensors (in particular television cameras) for picking up a two-dimensional image of the objects and selecting from the image an image portion corresponding to the optical code. Such systems also read the code contained in the selected image portion and extract the alphanumeric information of the code.

The image picked up by the camera normally includes a background in which are distinguishable a number of relevant regions varying considerably in brightness or colour and which correspond to optical code images, to graphically defined portions (e.g. tables or matrixes, labels and geometrically defined structures) and to alphanumeric signs automatically or manually impressed and arranged in orderly manner (e.g. aligned in rows).

Other known systems provide solely for locating in the image any specifically ordered regions corresponding, for example, to an optical code. In particular, systems are known for extracting from the image a subimage corresponding to the optical code.

SUMMARY OF THE INVENTION

Aim of the present invention is to provide a method of locating, in an image of the above said type, any relevant highly variable brightness or colour region, regardless of whether an optical code is included in the image or not. More specifically, aim of the present invention is to eliminate from the image any relevant specifically ordered regions (normally corresponding to optical code images or geometrically defined structures), by locating relevant regions of a different order from the relevant specifically ordered regions.

According to the present invention, there is provided a method of locating highly variable brightness or colour regions in an acquired image, wherein said image has a number of relevant regions, including: at least one specifically ordered region and at least one highly variable brightness region; the order level of said highly variable brightness or colour region differing from the order of the specifically ordered region; characterized by comprising the steps of: performing a first processing step of said image to generate a first intermediate binary image representing the acquired image divided into a number of contiguous first subimages, each having a first logic value if corresponding to a detected specifically ordered region, and a second logic value if corresponding to a region of the image other than said specifically ordered region; performing a second processing step of said acquired image to generate a second intermediate binary image representing the image divided into a number of contiguous second subimages, each having a first logic value if corresponding to a detected said specifically ordered region or a detected highly variable brightness region, and a second logic value otherwise; subtracting the first intermediate binary image from the second intermediate binary image to generate an output binary image defined by a number of contiguous subimages having said first logic value only at said highly variable brightness or colour regions of an order other than that of the specifically ordered regions, and said second logic value elsewhere.

More specifically, said first processing step of said acquired image comprises the steps of: calculating a number of gradient vectors for a number of elementary images into which said image is divided; determining significant gradient of an amplitude above a threshold value; assigning said first logic value to the first subimages containing significant gradient vectors with said predetermined orientation; assigning said second logic value to the first subimages containing significant gradient vectors with an orientation other than said predetermined orientation; and assigning said second logic value to the first subimages containing nonsignificant gradient vectors; said second processing step of said acquired image comprises the steps of; calculating a number of gradient vectors for a number of elementary images into which said image is divided; determining significant gradients of an amplitude above a threshold value; assigning said first logic value to the second subimages containing significant gradient vectors; assigning said second logic value to the second subimages containing nonsignificant gradient vectors.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
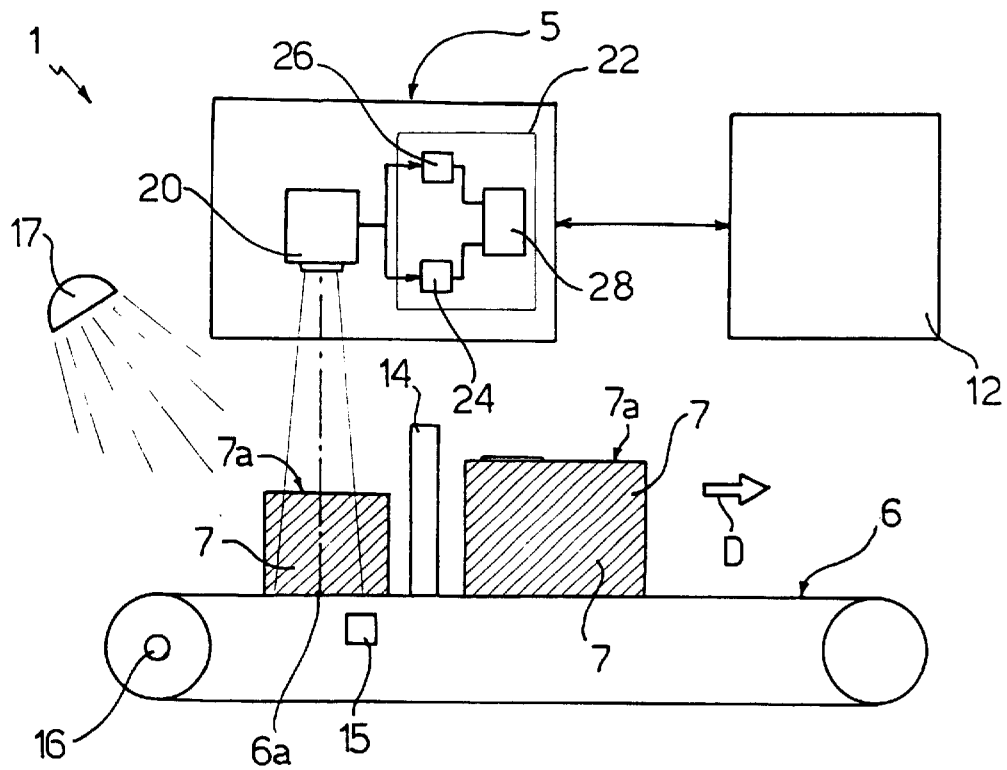
FIG. 1 shows, schematically, an automatic optical code reading device implementing the method according to the present invention.
Figure 2:
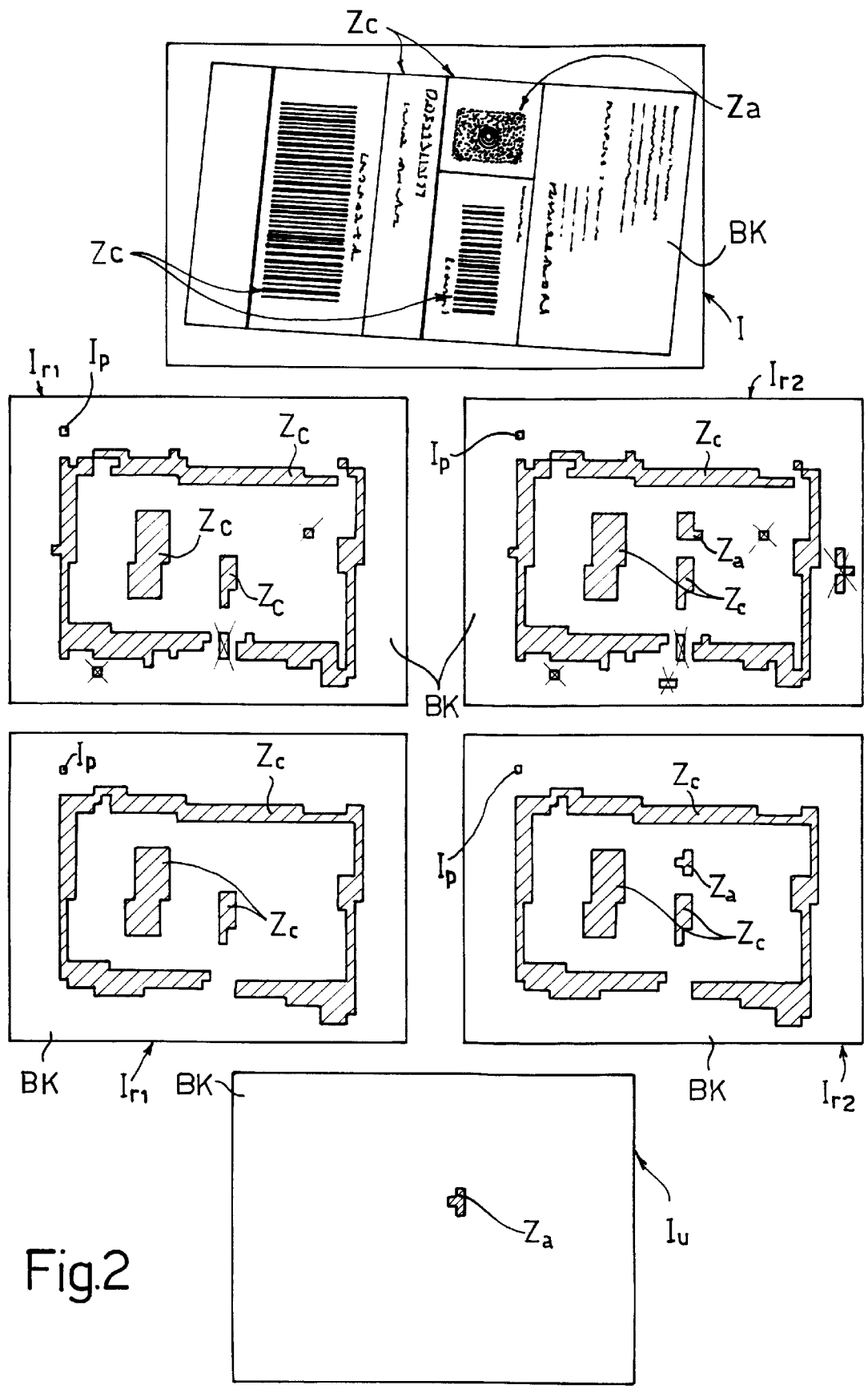
FIG. 2 shows a series of images processed according to the method of the present invention.

Number 1 in FIG. 1 indicates as a whole an automatic optical code reading device comprising a read head 5 facing a conveyor belt 6 to scan objects 7 laying on conveyor belt 6 and traveling in a straight horizontal direction D. Each object 7 comprises, on a face 7a facing read head 5, a scanning region comprising a number of relevant regions (FIG. 2). The scanning region may comprise, in general, a preferably flat surface defining a background BK (preferably, but not necessarily, of uniform colour) and a number of relevant regions Z distinguishable from the background by structure and colour and containing information or a structure for the insertion of information. For example, the relevant regions may comprise:

- portions delimited by graphic signs, such as tables or matrixes, labels and geometrically defined structures in general;
- automatically impressed alphanumeric signs (printed or typed by a typewriter or a printer);
- manually impressed alphanumeric signs;

photographs;

optical codes defined by a number of graphic signs whereby information is coded in the form of a sequence of black and white or variously coloured regions extending in one or more directions.

Optical codes comprise:

bar codes defined by a number of differently coloured alternating straight elements (black bars and white spaces) adjacent to one another and parallel to one direction;

two-dimensional codes defined by a number of differently coloured elements of a given shape, adjacent to one another and extending in two (or more) directions; and colour codes.

Examples of two-dimensional optical codes are the so-called ID-CODE codes defined by black or white square unit elements and MAXICODE codes defined by black or white hexagonal unit elements.

In the embodiment shown, the relevant regions comprise, in general:

at least one specifically ordered region Zc containing an optical code defined by elements, all with a predetermined orientation, in particular elements parallel to one direction as in the case of a bar code; and at least one highly variable brightness region Za containing a number of elements with a certain order level (e.g. a MAXICODE), which order level, however, does not correspond with the order of the specifically ordered region Zc.

In the embodiment shown, the specifically ordered region Zc is a region containing bar codes, each defined by elements parallel to one direction d and the highly variable brightness region is a region (Za) containing a two-dimensional optical code, i.e. defined by elements with orientations not coinciding with the one orientation of the bar code. The specifically ordered region Zc also includes retangular frame structures.

Device 1 comprises an electronic control and processing unit 12 cooperating with read head 5.

The device also comprises a sensor 14 located along conveyor belt 6 to determine the height of objects 7 traveling along the belt; a sensor 15 to determine the presence of objects 7 close to read head 5 and a speed sensor 16 to determine the traveling speed of the belt (and therefore of the conveyed objects) with respect to read head 5.

Device 1 also comprises a lighting device 17 for lighting the section of the belt detected by read head 5.

With reference to FIG. 1, read head 5 comprises a linear (e.g. CCD) television camera 20 for scanning a line 6a of the belt (continuously or when enabled by sensors 14, 15, 16) and a circuit 22 for processing the output signals of camera 20. Circuit 22 comprises a filter 24 input-connected to the output of camera 20; a memory 26 input-connected to the output of camera 20 and for storing images and one (or more) programmable data processing unit (DSP—digital signal processor) 28 cooperating with filter 24 and memory 26.

Figure 3:
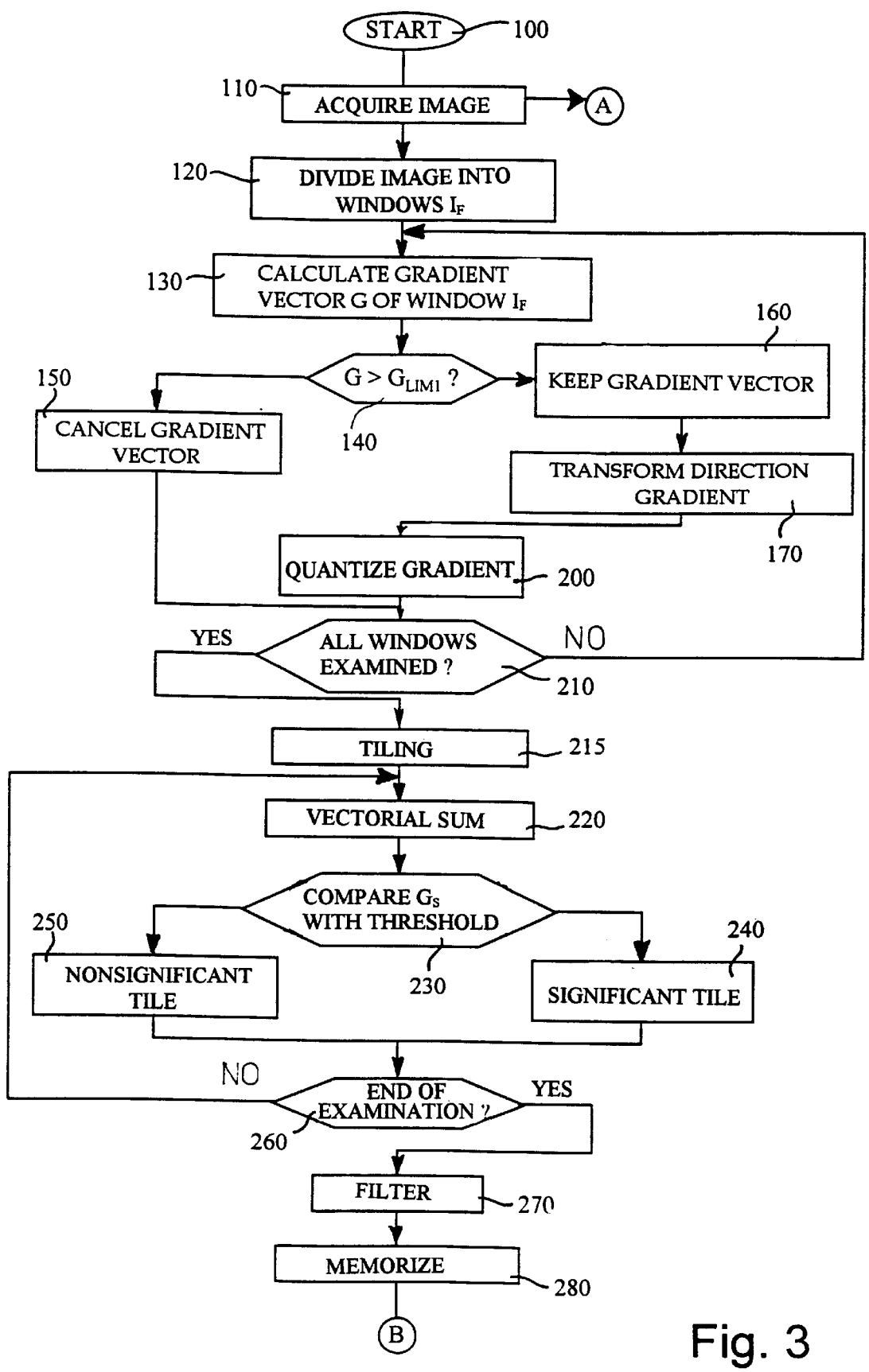
FIGS. 3 and 3a show a logic operating diagram of the method according to the present invention.
Figure 3A:
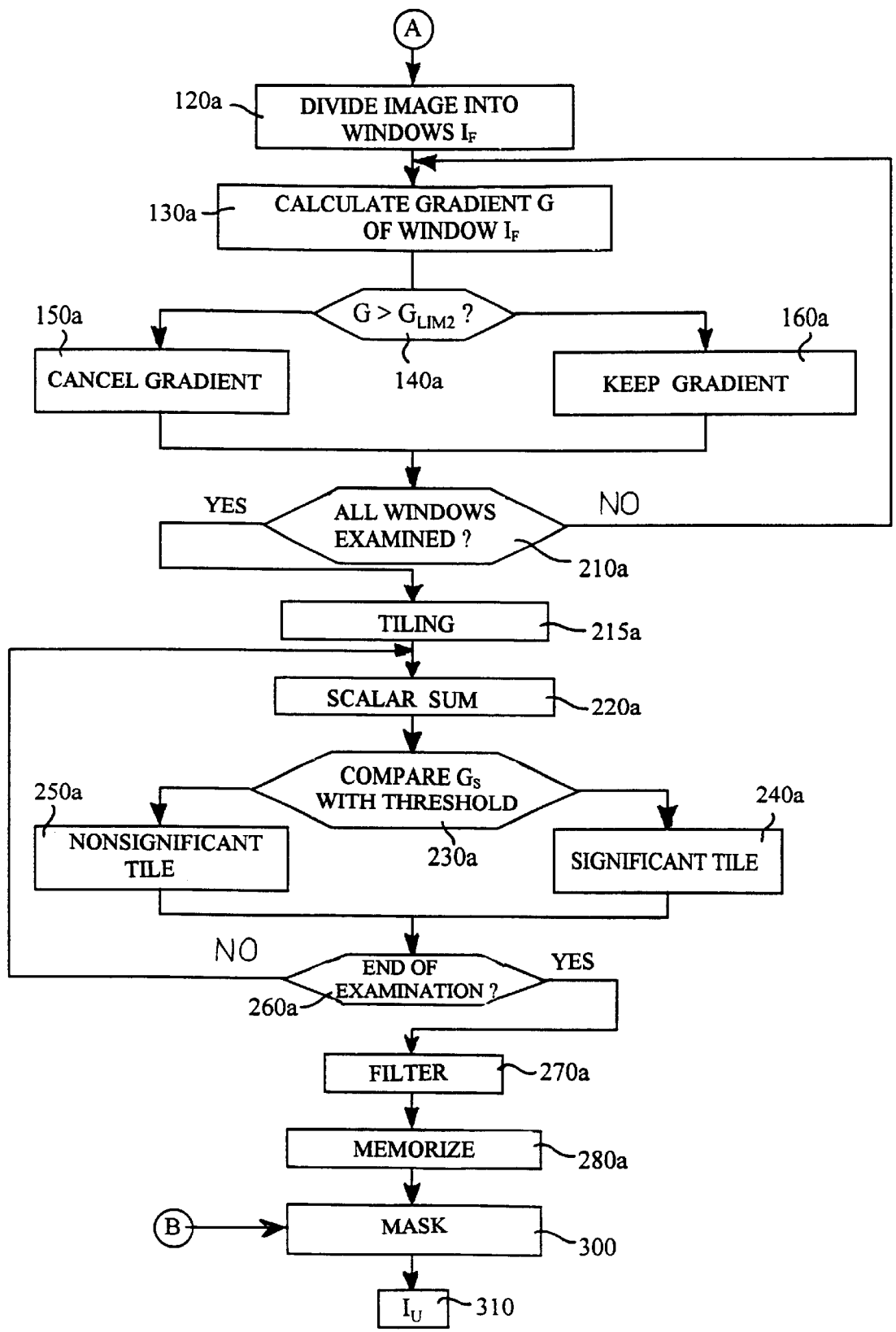

FIGS. 3 and 3a show a flow chart of the operating cycle of processing circuit 22.

With reference to FIG. 3, a start block 100 goes on to a block 110, in which the lines 6a scanned by camera 20 are composed electronically to form a two-dimensional image (memorized in memory 26) of conveyor belt 6 and/or objects 7. A digital image I (FIG. 2) is thus formed, comprising a matrix of pixels, each characterized by a number defining its grey level. The acquired digital image I may comprise the image of one or more objects 7, and in which are visible the relevant regions Z and background BK.

In particular, the images of specifically ordered region Zc and of highly variable brightness region Za are clearly visible and distinguishable against background BK in image I.

Block 110 is followed by a block 120, in which acquired digital image I is divided into a number of elementary images (windows) if, each comprising a predetermined N number of pixels.

Figure 4:
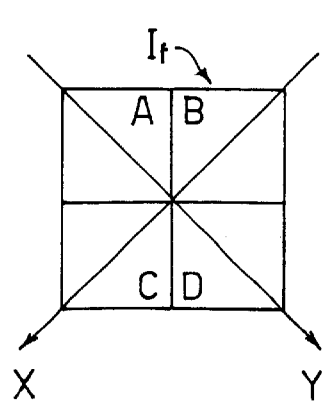
FIGS. 4, 5, 6 show examples of operating steps according to the method of the present invention.

For example, Windows If may comprise four pixels, as shown in FIG. 4.

Block 120 is followed by a block 130, which calculates the brightness gradient vector G of each window If of image I.

In the embodiment shown (four-pixel window), if A, B, C, D are the respective numeric brightness values of the pixels in window If, the gradient vector is calculated according to the equations:

$GX=C-B$ $GY=D-A$ $\alpha = \text{arctg}(GY/GX)$ (if $GX \neq 0$ or $\alpha = p/2$ if $GX = 0$)

where GX and GY are the components of gradient vector G along the X and Y axes (FIG. 4), and α is the angle formed by the gradient vector and the X axis of a cartesian reference system having the X axis along the diagonals of pixels B,C, and the Y axis along the diagonals of pixels A,D.

Block 130 is followed by a block 140, which compares the amplitude of each calculated gradient vector with a threshold value Glim1 established during initialization. If the amplitude of the gradient vector is below the threshold, block 140 is followed by a block 150, which cancels the gradient vector as being nonsignificant by representing slow variations in brightness. Conversely (block 160 following block 140), the calculated gradient vector is considered significant by representing rapid variations in brightness, and is kept for subsequent processing.

Block 160 is followed by a block 170, which effects a transformation of each selected calculated gradient vector to determine at least one given direction and given side for the specifically ordered region which direction and side are assigned to all the calculated gradients. The transformation operator in block 170 is capable of passing from gradient space (defined by amplitude, direction and side) to direction space (only defined by amplitude and direction), so that, when transformed, two gradients with the same amplitude and direction but opposite sides are mapped in the same vector in the directions space.

One possible transformation is that whereby the gradient vectors angles are multiplied by a factor equal to the number of sides of the unit element forming the optical code in specifically ordered region Zc.

In the example shown (specifically ordered region Zc comprising image of bar codes and rectangular frame structures), the transformation is effected by doubling the angle α of each gradient vector.

Figure 5:
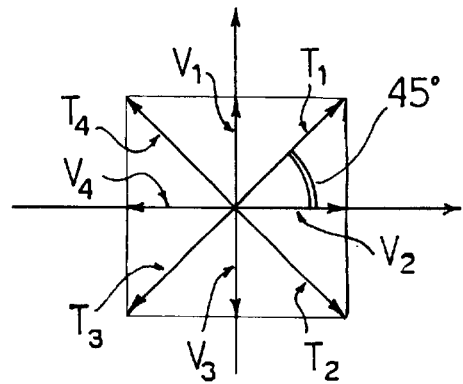

Block 170 is followed by a block 200 in which each gradient vector G transformed in block 170 is approximated to the nearest of a series of reference vectors (gradient vector quantization). More specifically, the reference vectors may comprise four first unit vectors $V_1$, $V_2$, $V_3$, $V_4$ perpendicular to one another, and four second vectors $T_1$, $T_2$, $T_3$, $T_4$ perpendicular to one another and forming a 45° angle with the first vectors (FIG. 5).

Block 200 is followed by a block 210, which determines whether examination (and calculation of the gradient vector)

of windows If defined in block 120 is terminated. In the event of a negative response (windows If still being examined), block 210 goes back to block 130 to calculate a further gradient vector. Conversely (examination of windows If terminated), block 210 goes on to a block 215.

Block 215 groups the quantized gradients of image I into a number of subsets (subimages) or so-called tiles Ip, which are obtained by dividing the acquired image I into a number of subimages (tiles) Ip, each comprising a number of windows If. For example, tiles Ip may be defined by a hundred pixels of the original image I and so comprise, in the embodiment shown, twenty-five windows If (each window comprises four pixels).

The next processing step provides for determining which regions in the original digitized image I contain gradient vectors corresponding to specifically ordered region Zc (the highly variable brightness regions are not considered).

Block 215 is followed by a block 220, which calculates the vectorial sum of the gradient vectors processed in blocks 170, 200 and relating to a subimage Ip, i.e. the transformed and quantized gradient vectors of the various windows If are composed to generate a sum gradient vector Gs associated with the currently selected tile Ip.

Figure 6:
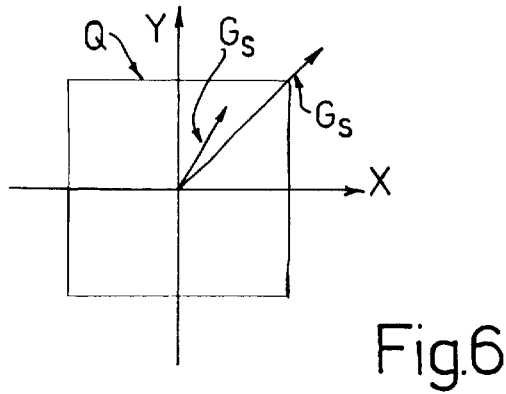

Block 220 is followed by a block 230, in which the sum gradient vector Gs is compared with threshold values (FIG. 6). If the sum gradient vector Gs is above the threshold values, block 230 goes on to a block 240. Conversely (sum gradient vector Gs below the threshold values), block 230 goes on to a block 250.

In a cartesian X, Y reference system, the threshold values may be represented, for example, by the sides of a square Q (FIG. 6), so that, if one end of sum gradient vector Gs lies within the perimeter of square Q, block 230 goes on to block 250. Conversely (end of sum gradient vector Gs outside the perimeter of square Q), block 230 goes on to block 240.

The situation determined in block 240 is that in which the value of the sum gradient vector in the space of directions is above the threshold; in which case, the respective tile Ip is considered significant by comprising a sufficient number of gradient vectors of significant amplitude and substantially the same direction (specifically ordered region detected—possible presence of an optical code or rectangular frame structure). The selected tile Ip is therefore assigned a first logic value (in particular, a logic "1") indicating tile Ip is to be considered as relating to a specifically ordered region.

The situation determined in block 250 is that in which the value of sum gradient vector Gs in the space of directions is below the threshold; in which case, the respective tile is considered nonsignificant by comprising an insufficient number of gradients of significant amplitude and substantially the same direction. The selected tile is therefore assigned a second logic value (in particular, a logic "0") indicating tile Ip is to be considered nonsignificant and corresponding to an image region other than the specifically ordered region, i.e. background BK, to a portion of the image with no significant variation in brightness or colour, or to a highly variable brightness portion of the image of an order other than that of the specifically ordered region.

Blocks 240, 250 are followed by a block 260, which determines whether all the tiles Ip in image I have been examined. In the event of a negative response (image still being examined), block 260 goes back to block 220 to examine a further tile Ip. Conversely (examination of image I terminated), block 260 goes on to a block 270.

The output of block 260 is a first intermediate binary image Ir1 (FIG. 2) representing image I divided into a number of contiguous tiles Ip, each having a logic value "1" (significant, "black" tile) if likely to correspond to a specifically ordered region Zc (presence of an optical code or rectangular frame structure), or a logic value "0" (nonsignificant, "white" tile) if corresponding to the background image or to a highly variable brightness region Za of an order other than that of specifically ordered region Zc.

The elementary unit representing first intermediate binary image Ir1 is the same size as tile Ip. In other words, tiles Ip constitute the pixels of image Ir1.

First intermediate binary image Ir1 is supplied to a block 270 downstream from block 260 which (in known manner) performs a filtering process to reduce the effects of acquisition noise and eliminate any "dirty" regions in the image. The operations performed in block 270 provide for eliminating any short or narrow groups of significant tiles.

The elementary unit representing image Ir1 obviously remains the same size as tile Ip and the sharpness of the image is reduced in favour of a reduction in noise. Block 270 may also eliminate any apparently significant spurious regions of image Ir1 (i.e. defined by "black" tiles) not actually corresponding to the specifically ordered region (to the bar code image, in the example shown). Block 270 provides in known manner for automatically recognizing such spurious regions and for selecting the regions corresponding to the bar code by means of an automatic pattern recognition process for discerning spurious regions.

FIG. 2 shows image Ir1 before (top) and after (bottom) processing by block 270. A comparison of the two images clearly shows elimination of the spurious regions (crossed-out tiles).

The output of block 270 is therefore an image (first intermediate binary image Ir1) defined by a number of tiles Ip, which may have a first or second state:

tiles corresponding to specifically ordered regions Zc have a first logic state to define a region of image I containing a number of significant gradient vectors of substantially the same orientation (in particular, parallel gradient vectors in the case of a bar code);

tiles corresponding to highly variable brightness regions Za of an order other than that of specifically ordered regions Zc have a second logic state to define an image region containing a number of significant gradients oriented differently from the specifically ordered region (e.g. not parallel, in the case of a bar code); and tiles corresponding to regions with no significant variation in brightness or colour (e.g. the background) have the second logic state to define an image region with no significant gradients.

Image Ir1 processed in block 270 is memorized in the next block 280.

The image acquired in block 110 is also supplied to a block 120a (FIG. 3a), which, like block 120, divides the acquired digital image I into a number of elementary images (windows) If, each comprising a predetermined N number of pixels (e.g. four). The windows If in block 120a are the same size as in corresponding block 120.

Block 120a is followed by a block 130a, which calculates the brightness gradient G of each window If of image I.

In the embodiment shown (four-pixel window), if A, B, C, D are the respective numeric brightness values of the pixels in the window, the gradient is calculated according to the equations:

$GX = C - B$ $GY = D - A$ where GX and GY are the components of gradient vector G along the X and Y axes (FIG. 4).

In this case, gradients in any way significant, are searched regardless of their order (angle α), angle α is not calculated.

Block 130a is followed by a block 140a, which compares the amplitude of each calculated gradient with a threshold value Glim2 established during initialization. If the amplitude of the gradient is below threshold Glim2, block 140a is followed by a block 150a, which cancels the gradient as being nonsignificant by representing slow variations in brightness. Conversely (block 160a following block 140a), the calculated gradient is considered significant by representing rapid variations in brightness, and is kept for subsequent processing.

Block 160a is followed by a block 210a, which determines whether examination (and calculation of the gradients) of windows If defined in block 120a is terminated. In the event of a negative response (windows If still being examined), block 210a goes back to block 130a to calculate a further gradient. Conversely (examination of windows If terminated), block 210a goes on to a block 215a.

It will be noted that the operations in blocks 140a, 150a, 160a, 210a are performed with no transformation as in block 170, i.e. with no transformation from gradient to direction space.

Block 215a groups the gradients of image I into a number of subsets (subimages) or so-called tiles Ip, which are the same size as tiles Ip in block 215 and are obtained by dividing the acquired image I into a number of subimages (tiles) Ip, each comprising a number of windows If. For example, tiles Ip may be defined by a hundred pixels of the original image I, and so comprise, in the embodiment shown, twenty-five windows If (each window comprises four pixels).

The next processing step provides for determining which regions in the original digitized image I contain a large number of gradients, regardless of the direction, and so correspond to specifically ordered regions and to highly variable brightness regions of an order other than that of the specifically ordered regions.

Block 215a is followed by a block 220a, which calculates the scalar sum of the gradients kept by block 160a and relating to a subimage Ip, i.e. the gradients of the various windows If are composed to generate a sum gradient Gs associated with the currently selected tile Ip.

Block 220a, is followed by a block 230a, in which the sum gradient Gs is compared with threshold values. If the sum gradient Gs is above the threshold values, block 230a goes on to a block 240a. Conversely (sum gradient Gs below the threshold values), block 230a goes on to a block 250a.

The situation determined in block 240a is that in which the value of the sum gradient is above the threshold; in which case, the respective tile Ip is considered significant by comprising a sufficient number of gradients of significant amplitude (possible presence of a specifically ordered region corresponding to the image of an optical code and/or of a highly variable brightness or colour region). The selected tile Ip is therefore assigned a first logic value (in particular, a logic "1") indicating tile Ip is to be considered as relating to a specifically ordered region or to a highly variable brightness or colour region.

The situation determined in block 250a is that in which the value of sum gradient Gs in the space of directions is below the threshold; in which case, the respective tile is considered nonsignificant by comprising an insufficient number of gradients of significant amplitude. The selected tile is therefore assigned a second logic value (in particular, a logic "0") indicating tile Ip is to be considered nonsignificant and preferably corresponding to the background or at any rate to a region with no significant variation in brightness or colour.

Blocks 240a, 250a are followed by a block 260a, which determines whether all the tiles Ip in image I have been examined. In the event of a negative response (image still being examined), block 260a goes back to block 220a to examine a further tile Ip. Conversely (examination of image I terminated), block 260a goes on to a block 270a.

The output of block 260a is a second intermediate binary image Ir2 (FIG. 2) representing image I divided into a number of contiguous tiles Ip, each having a logic value "1" (significant, "black" tile) if likely to correspond to a specifically ordered region and/or to a highly variable brightness region, or a logic value "0" (nonsignificant, "white" tile) if corresponding to the background image or to a region with no significant variation in brightness or colour.

As for image Ir1 in block 270, image Ir2 is processed to eliminate any spurious regions (block 270a following block 260a), and the output of block 270a is supplied to a block 280a. FIG. 2 shows image Ir2 before (top) and after (bottom) processing by block 270a. A comparison of the two images clearly shows elimination of the spurious regions (crossed-out tiles).

The elementary unit representing second intermediate binary image Ir2 is the same size as that representing first intermediate binary image Ir1.

The output of block 270a is therefore an image (second intermediate binary image Ir2) defined by a number of tiles Ip, which may have a first or second state:

tiles corresponding to specifically ordered regions have a first logic state ("1") to define a region of image I containing a large number of significant gradients;

tiles corresponding to highly variable brightness or colour regions have the first logic state ("1") to define a region of image I containing a large number of significant gradients; and tiles corresponding to the background image or regions with no significant variation in brightness or colour have a second logic state ("0") to define an image region with no significant gradients.

The first and second intermediate binary images Ir1 and Ir2 memorized in respective blocks 280 and 280a are supplied to a masking block 300 for subtracting image Ir1 (according to the get theory) from image Ir2.

As stated, second intermediate binary image Ir2 comprises significant tiles both at specifically ordered regions and highly variable brightness or colour regions of any order; while first intermediate binary image Ir1 comprises significant tiles at specifically ordered regions only. When image Ir1 is subtracted from image Ir2, the contributions of the specifically ordered regions of the two images cancel each other out, so that an output image Iu is generated comprising only the highly variable brightness or colour regions of an order other than that of the specifically ordered regions. The size of the tiles, in fact, is the same, and the specifically ordered regions occupy the same positions in both images Ir1 and Ir2, by virtue of the process described to acquire images Ir1, Ir2 working on the same original image, and using algorithms (blocks 120, 120a and 215, 215a) effecting the same divisions.

The operation in block 300 is performable using the following equation:

$$Iu(i,j)=I2(i,j) \text{ AND NOT } I1(i,j)$$

where:

Iu(i,j) is the logic value of the tile with coordinates i,j in output image Iu;

I2(i,j) is the logic value of the tile with coordinates i,j in second intermediate binary image Ir2; and I1(i,j) is the logic value of the tile with coordinates i,j in first intermediate binary image Ir1.

An output image Iu is therefore generated which only comprises significant tiles in the highly variable brightness or colour regions of an order other than that of the specifically ordered regions, i.e. the specifically ordered regions are eliminated.

That is at least one relevant highly variable brightness or colour region containing information is located.

The output image Iu processed in block 300 is then supplied for subsequent processing to a block 310, which operates on the regions of image I corresponding to significant tiles.

The advantages of the present invention are clear from the foregoing description. The method described in fact provides for locating highly variable brightness or colour regions in an image by eliminating the specifically ordered regions.

Possible applications include the following:

The specifically ordered region of the image comprises a bar code image and the highly variable brightness or colour regions comprise images of two-dimensional optical codes: in this case, the transformation in block 170 doubles the gradient vectors angle and output image Iu only comprises tiles corresponding to highly variable brightness or colour regions, thus locating the two-dimensional optical code.

The specifically ordered region of the image comprises the image of a table, a matrix or a geometrically defined structure and the highly variable brightness regions comprise images of two-dimensional optical codes: in this case, the transformation in block 170 doubles the gradient vectors angle and the output image only comprises tiles corresponding to highly variable brightness or colour regions, thus locating the two-dimensional code.

As regards the method shown in FIGS. 3 and 3a, the main adjustable parameters are the following:

threshold values Glim1 and Glim2 used respectively in blocks 140 and 140a and which are determined experimentally;

the threshold values used respectively in blocks 230 and 230a and which are determined experimentally; and the size of tile Ip used to divide the image in blocks 215 and 215a.

Typically, the selected tile size is approximately half the apparent minimum size of the code (i.e. the size of the code measured in image I), so as to ensure the code image contains at least one whole tile.

What is claimed is:

1. A method of locating highly variable brightness or color regions in an acquired image (I), wherein said image (I) has a number of relevant regions, each of said regions having an order comprised of one of an identifying geometrical arrangement, a color arrangement and brightness arrangement, said regions including at least one specifically ordered region (Zc); and at least one highly variable brightness or color region (Za); the order of said highly variable brightness or color region differing from the order of the specifically ordered region; said method comprising the steps of:

performing a first processing step of said image (I) to generate a first intermediate binary image (Ir1) based on gradient directions in said acquired image, and representing the acquired image (I) divided into a number of first subimages (Ip), each having a first logic value if corresponding to a detected specifically ordered region and a second logic value otherwise;

performing a second processing step of said acquired image (I) to generate a second intermediate binary image (Ir2) based on gradient amplitudes in said acquired image, and representing the image (I) divided into a number of second subimages (Ip), each having a first logic value if corresponding to a detected specifically ordered region or a detected highly variable brightness or color region and a second logic value otherwise;

comparing the first intermediate binary image (Ir1) and the second intermediate binary image (Ir2) to generate an output binary image (Iu) defined by a number of subimages (Ip) having a first logic value only at said highly variable brightness or color regions and said second logic value elsewhere.

2. A method as claimed in claim 1, wherein the dimensions of said first subimages correspond with the dimensions of said second subimages.

3. A method as claimed in claim 1, wherein said comparing step comprises a masking step in which the following operation is performed:

$$Iu(i,j)=I2(i,j) \text{ AND NOT } I1(i,j)$$

where:

Iu(i,j) is the logic value of a subimage, with predetermined coordinates (i,j) of said output binary image (Iu);

I2(i,j) is the logic value of a second subimage, with predetermined coordinates (i,j) of said second intermediate binary image (Ir2); and I1(i,j) is the logic value of a first subimage, with predetermined coordinates (i,j) of said first intermediate binary image (Ir1).

4. A method of locating highly variable brightness or color regions according to claim 1, wherein said first subimages are contiguous and said second subimages are contiguous.

5. A method of locating highly variable brightness or color regions in an acquired image (I), wherein said image (I) has a number of relevant regions, each of said regions having an order comprised of one of an identifying geometrical arrangement, a color arrangement and brightness arrangement, said regions including at least one specifically ordered region (Zc), and at least one highly variable brightness or color region (Za), the order of said highly variable brightness or color region differing from the order of the specifically ordered region; said method comprising the steps of:

performing a first processing step of said image (I) to generate a first intermediate binary image (Ir1) representing the acquired image (I) divided into a number of first subimages (Ip), each having a first logic value if corresponding to a detected specifically ordered region and a second logic value otherwise;

performing a second processing step of said acquired image (I) to generate a second intermediate binary image (Ir2) representing the image (I) divided into a number of second subimages (Ip), each having a first logic value if corresponding to a detected specifically ordered region or a detected highly variable brightness or color region and a second logic value otherwise;

comparing the first intermediate binary image (Ir1) and the second intermediate binary image (Ir2) to generate an output binary image (Iu) defined by a number of subimages (Ip) having a first logic value only at said highly variable brightness or color region and a second logic value elsewhere, wherein said first processing step of said acquired image (I) comprises the steps of:
calculating a number of gradient vectors for a number of elementary images (If) into which said image (I) is divided;
determining significant gradients of an amplitude above a threshold value;
assigning said first logic value to the first subimages (Ip) containing significant gradient vectors of an order congruent with the order of said specifically ordered region;
assigning said second logic value to the first subimages (Ip) containing significant gradient vectors of an order other than the order of said specifically ordered region; and
assigning said second logic value to the first subimages (Ip) containing nonsignificant gradient vectors;
and said second processing step of said acquired image (I) comprises the steps of:
calculating a number of gradients for a number of elementary images (If) into which said image (I) is divided;
determining significant gradients of an amplitude above a threshold value;
assigning said first logic value to the second subimages (Ip) containing significant gradients; and
assigning said second logic value to the second subimages (Ip) containing nonsignificant gradients.

6. A method of locating highly variable brightness or color regions in an acquired image (I), wherein said image (I) has a number of relevant regions, each of said regions having an order comprised of one of an identifying geometrical arrangement, a color arrangement and brightness arrangement, said regions including at least one specifically ordered region (Zc), and at least one highly variable brightness or color region (Za), the order of said highly variable brightness or color region differing from the order of the specifically ordered region; said method comprising the steps of:
performing a first processing step of said image (I) to generate a first intermediate binary image (Ir1) representing the acquired image (I) divided into a number of first subimages (Ip), each having a first logic value if corresponding to a detected specifically ordered region and a second logic value otherwise;
performing a second processing step of said acquired image (I) to generate a second intermediate binary image (Ir2) representing the image (I) divided into a number of second subimages (Ip), each having a first logic value if corresponding to a detected specifically ordered region or a detected highly variable brightness or color region and a second logic value otherwise;
comparing the first intermediate binary image (Ir1) and the second intermediate binary image (Ir2) to generate an output binary image (Iu) defined by a number of subimages (Ip) having a first logic value only at said highly variable brightness or color region and a second logic value elsewhere, wherein said first processing step of said acquired image (I) comprises:
a first step in which the acquired image (I) is divided into a number of elementary images (If), each comprising a predetermined number (N) of pixels; each pixel being assigned a value (A, B, C, D) representing the brightness of the pixel;
a second step in which a brightness gradient vector (G) is calculated for each of said elementary images (If);
a first comparing step to select, from the calculated said gradient vectors (G), gradient vectors having an amplitude above at least one threshold value (Glim1) and representing rapid variations in brightness;
a transformation step in which the selected gradient vectors are transformed to determine a given direction and a given side; which direction and side are assigned to all the gradient vectors;
a tiling step in which said acquired image (I) is divided into a number of said subimages (Ip), each comprising a number of elementary images (If);
a composition step in which the transformed gradient vectors relating to a selected subimage (Ip) are added to calculate a sum gradient vector (Gs);
a second comparing step in which said sum gradient vector (Gs) of each of said subimages (Ip) is compared with reference values to select) significant subimages containing a sufficient number of gradient vectors having substantially the same direction; the significant subimages being assigned said first logic value ("1"); said second comparing step also determining nonsignificant subimages containing a limited number of gradient vectors having substantially the same direction and the nonsignificant subimages being assigned said second logic value ("0");
said first processing step generating said first intermediate binary image (Ir1) representing said acquired image (I) divided into said subimages (Ip), each having a respective logic value.

7. A method as claimed in claim 6, wherein during said transformation step, the angle ($\alpha$) formed by said gradient vector with a cartesian reference system is multiplied by a factor equal to the number of sides of the geometrical figure defining the unit element of an optical code detectable in said specifically ordered region.

8. A method of locating highly variable brightness or color regions in an acquired image (I), wherein said image (I) has a number of relevant regions, each of said regions having an order comprised of one of an identifying geometrical arrangement, a color arrangement and brightness arrangement, said regions including at least one specifically ordered region (Zc), and at least one highly variable brightness or color region (Za), the order of said highly variable brightness or color region differing from the order of the specifically ordered region; said method comprising the steps of:
performing a first processing step of said image (I) to generate a first intermediate binary image (Ir1) representing the acquired image (I) divided into a number of first subimages (Ip), each having a first logic value if corresponding to a detected specifically ordered region and a second logic value otherwise;
performing a second processing step of said acquired image (I) to generate a second intermediate binary image (Ir2) representing the image (I) divided into a number of second subimages (Ip), each having a first logic value if corresponding to a detected specifically ordered region or a detected highly variable brightness or color region and a second logic value otherwise;
comparing the first intermediate binary image (Ir1) and the second intermediate binary image (Ir2) to generate an output binary image (Iu) defined by a number of subimages (Ip) having a first logic value only at said highly variable brightness or color region and a second logic value elsewhere, wherein said second processing step of said image (I) comprises:

a third step in which the acquired image (I) is divided into a number of elementary images (If), each comprising a predetermined number (N) of pixels; each pixel being assigned a value (A, B, C, D) representing the brightness of the pixel;

a fourth step in which a brightness gradient (G) is calculated for each of said elementary images (If);

a third comparing step to select, from the calculated said gradients (G), gradients having an amplitude above at least one threshold value (Glim2) and representing rapid variations in brightness;

a further tiling step in which said acquired image (I) is divided into a number of said subimages (Ip), each comprising a number of elementary images (If);

a further composition step in which the scalar sum of the selected gradient vectors relating to a selected subimage (Ip) is calculated to calculate a sum gradient (Gs);

a fourth comparing step in which said sum gradient (Gs) of each of said subimages (Ip) is compared with reference values to select significant subimages containing a sufficient number of gradients; the significant subimages being assigned said first logic value ("1"); said fourth comparing step also determining nonsignificant subimages containing a limited number of gradients; and the nonsignificant subimages being assigned said second logic value ("0");

said second processing step generating said second intermediate binary image (Ir2) representing said acquired image (I) divided into said subimages (Ip), each having a respective logic value.

9. A method of locating highly variable brightness or color regions in an acquired image (I), wherein said image (I) has a number of relevant regions, each of said regions having an order comprised of one of an identifying geometrical arrangement, a color arrangement and brightness arrangement, said regions including at least one specifically ordered region (Zc); and at least one highly variable brightness or color region (Za); the order of said highly variable brightness or color region differing from the order of the specifically ordered region; said method comprising the steps of:

performing a first processing step on gradients of said image (I) to generate a first intermediate binary image (Ir1) representing the acquired image (I) divided into a number of first subimages (Ip), each having a first logic value if corresponding to a detected specifically ordered region and a second logic value otherwise;

performing a second processing step on gradients of said acquired image (I) to generate a second intermediate binary image (Ir2) representing the image (I) divided into a number of second subimages (Ip), each having a first logic value if corresponding to a detected specifically ordered region or a detected highly variable brightness or color region and a second logic value otherwise;

comparing the fist intermediate binary image (Ir1) and the second intermediate binary image (Ir2) to generate an output binary image (Iu) defined by a number of subimages (Ip) having a first logic value only at said highly variable brightness or color regions and said second logic value elsewhere, wherein said first processing step of said acquired image (I) comprises the steps of:

calculating a number of gradient vectors for a number of elementary images (If) into which said image (I) is divided;

determining significant gradients of an amplitude above a threshold value;

assigning said first logic value to the first subimages (Ip) containing significant gradient vectors of an order congruent with the order of said specifically ordered region;

assigning said second logic value to the first subimages (Ip) containing significant gradient vectors of an order other than the order of said specifically ordered region; and assigning said second logic value to the first subimages (Ip) containing nonsignificant gradient vectors;

and said second processing step of said acquired image (I) comprises the steps of:

calculating a number of gradients for a number of elementary images (If) into which said image (I) is divided;

determining significant gradients of an amplitude above a threshold value;

assigning said first logic value to the second subimages (Ip) containing significant gradients; and assigning said second logic value to the second subimages (Ip) containing nonsignificant gradients.

10. A method of locating highly variable brightness or color regions in an acquired image (I), wherein said image (I) has a number of relevant regions, each of said regions having an order comprised of one of an identifying geometrical arrangement, a color arrangement and brightness arrangement, said regions including at least one specifically ordered region (Zc); and at least one highly variable brightness or color region (Za); the order of said highly variable brightness or color region differing from the order of the specifically ordered region; said method comprising the steps of:

performing a first processing step on gradients of said image (I) to generate a first intermediate binary image (Ir1) representing the acquired image (I) divided into a number of fist subimages (Ip), each having a first logic value if corresponding to a detected specifically ordered region and a second logic value otherwise;

performing a second processing step on gradients of said acquired image (I) to generate a second intermediate binary image (Ir2) representing the image (I) divided into a number of second subimages (Ip), each having a first logic value if corresponding to a detected specifically ordered region or a detected highly variable brightness or color region and a second logic value otherwise;

comparing the first intermediate binary image (Ir1) and the second intermediate binary image (Ir2) to generate an output binary image (Iu) defined by a number of subimages (Ip) having a first logic value only at said highly variable brightness or color regions and said second logic value elsewhere, wherein said first processing step of said acquired image (I) comprises:

a first step in which the acquired image (I) is divided into a number of elementary images (If), each comprising a predetermined number (N) of pixels; each pixel being assigned a value (A, B, C, D) representing the brightness of the pixel;

a second step in which a brightness gradient vector (G) is calculated for each of said elementary images (If);

a first comparing step to select, from the calculated said gradient vectors (G), gradient vectors having an amplitude above at least one threshold value (Glim1) and representing rapid variations in brightness;

a transformation step in which the selected gradient vectors are transformed to determine a given direction and a given side; which direction and side are assigned to all the gradient vectors;

a tiling step in which said acquired image (I) is divided into a number of said subimages (Ip), each comprising a number of elementary images (If);

a composition step in which the transformed gradient vectors relating to a selected subimage (Ip) are added to calculate a sum gradient vector (Gs);

a second comparing step in which said sum gradient vector (Gs) of each of said subimages (Ip) is compared with reference values to select) significant subimages containing a sufficient number of gradient vectors having substantially the same direction; the significant subimages being assigned said first logic value ("1"); said second comparing step also determining nonsignificant subimages containing a limited number of gradient vectors having substantially the same direction and the nonsignificant subimages being assigned said second logic value ("0");

said first processing stop generating said first intermediate binary image (Ir1) representing said acquired image (I) divided into said subimages (Ip), each having a respective logic value.

11. A method as claimed in claim 10, wherein during said transformation step, the angle ($\alpha$) formed by said gradient vector with a cartesian reference system is multiplied by a factor equal to the number of sides of the geometrical figure defining the unit element of an optical code detectable in said specifically ordered region.

12. A method of locating highly variable brightness or color regions in an acquired image (I), wherein said image (I) has a number of relevant regions, each of said regions having an order comprised of one of an identifying geometrical arrangement, a color arrangement and brightness arrangement, said regions including at least one specifically ordered region (Zc); and at least one highly variable brightness or color region (Za); the order of said highly variable brightness or color region differing from the order of the specifically ordered region; said method comprising the steps of:

performing a first processing step on gradients of said image (I) to generate a first intermediate binary image (Ir1) representing the acquired image (I) divided into a number of first subimages (Ip), each having a first logic value if corresponding to a detected specifically ordered region and a second logic value otherwise;

performing a second processing step on gradients of said acquired image (I) to generate a second intermediate binary image (Ir2) representing the image (I) divided into a number of second subimages (Ip), each having a first logic value if corresponding to a detected specifically ordered region or a detected highly variable brightness or color region and a second logic value otherwise;

comparing the first intermediate binary image (Ir1) and the second intermediate binary image (Ir2) to generate an output binary image (Iu) defined by a number of subimages (Ip) having a first logic value only at said highly variable brightness or color regions and said second logic value elsewhere, wherein said second processing step of said image (I) comprises:

a third step in which the acquired image (I) is divided into a number of elementary images (If), each comprising a predetermined number (N) of pixels; each pixel being assigned a value (A, B, C, D) representing the brightness of the pixel;

a fourth step in which a brightness gradient (G) is calculated for each of said elementary images (If);

a third comparing step to select, from the calculated said gradients (G), gradients having an amplitude above at least one threshold value (Glim2) and representing rapid variations in brightness;

a further tiling step in which said acquired image (I) is divided into a number of said subimages (Ip), each comprising a number of elementary images (If);

a further composition step in which the scalar sum of the selected gradient vectors relating to a selected subimage (Ip) is calculated to calculate a sum gradient (Gs);

a fourth comparing step in which said sum gradient (Gs) of each of said subimages (Ip) is compared with reference values to select significant subimages containing a sufficient number of gradients; the significant subimages being assigned said first logic value ("1"); said fourth comparing step also determining nonsignificant subimages containing a limited number of gradients; and the nonsignificant subimages being assigned said second logic value ("0");

said second processing step generating said second intermediate binary image (Ir2) representing said acquired image (I) divided into said subimages (Ip), each having a respective logic value.

13. A method of locating highly variable brightness or color regions in an acquired image (I), wherein said image (I) has a number of relevant regions, each of said regions having an order comprised of one of an identifying geometrical arrangement, a color arrangement and brightness arrangement, wherein said regions including at least one specifically ordered region (Zc) and at least one highly variable brightness or color region (Za) and wherein the order of said highly variable brightness or color region differs from the order of the specifically ordered region; said method comprising the steps of:

generating a first intermediate binary image (Ir1) based on gradient vectors in said acquired image, and representing the acquired image (I) divided into a number of first subimages (Ip), each having a first logic value if corresponding to a detected specifically ordered region and a second logic value otherwise;

generating a second intermediate binary image (Ir2) based on gradient amplitudes in said acquired image, and representing the image (I) divided into a number of second subimages (Ip), each having a first logic value if corresponding to a detected specifically ordered region or a detected highly variable brightness or color region and a second logic value otherwise;

comparing the first intermediate binary image (Ir1) with the second intermediate binary image (Ir2) to generate an output binary image (Iu) defined by a number of subimages (Ip) having a first logic value only at said highly variable brightness or color regions and said second logic value elsewhere.

* * * * *